United States Patent
Koerner et al.

(10) Patent No.: US 9,643,728 B2
(45) Date of Patent: May 9, 2017

(54) SYSTEM FOR PREVENTING WATER CONDENSATION INSIDE AIRCRAFT

(71) Applicant: HONEYWELL INTERNATIONAL INC., Morristown, NJ (US)

(72) Inventors: Mike Koerner, Rancho Palos Verdes, CA (US); Zia Iqbal Mirza, Irvine, CA (US); Thach Nguyen, Westminster, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 491 days.

(21) Appl. No.: 14/223,638

(22) Filed: Mar. 24, 2014

(65) Prior Publication Data

US 2015/0266584 A1    Sep. 24, 2015

(51) Int. Cl.
*B64D 13/00*    (2006.01)
*B64C 1/06*    (2006.01)

(52) U.S. Cl.
CPC ............ *B64D 13/00* (2013.01); *B64C 1/067* (2013.01); *Y02T 50/44* (2013.01); *Y02T 50/46* (2013.01); *Y02T 50/56* (2013.01)

(58) Field of Classification Search
CPC ................................ B64D 13/00; B64C 1/067
USPC .......................................................... 454/76
See application file for complete search history.

(56) References Cited

U.S. PATENT DOCUMENTS

| | | | | |
|---|---|---|---|---|
| 3,740,905 A * | 6/1973 | Adams | ..................... | B64C 1/067 165/231 |
| 4,742,760 A * | 5/1988 | Horstman | ............... | B64D 13/00 244/118.5 |
| 5,386,952 A * | 2/1995 | Nordstrom | ............... | B64C 1/067 244/118.1 |
| 5,788,184 A * | 8/1998 | Eddy | ........................ | B32B 5/02 244/119 |
| 5,897,079 A * | 4/1999 | Specht | ..................... | B64C 1/067 244/118.5 |
| 6,491,254 B1 * | 12/2002 | Walkinshaw | ............ | A62C 3/08 244/118.5 |
| 7,472,865 B2 * | 1/2009 | Sinsabaugh | ............... | B64B 1/62 244/29 |
| 7,591,869 B2 * | 9/2009 | Jensen | ................... | B64D 13/00 55/396 |
| 7,871,038 B2 * | 1/2011 | Space | ..................... | B64D 13/06 244/118.5 |
| 8,328,607 B2 * | 12/2012 | Reisbach | ............... | B64D 13/00 454/71 |
| 2006/0243859 A1 * | 11/2006 | Lessi | ........................ | A62B 7/14 244/118.5 |

(Continued)

FOREIGN PATENT DOCUMENTS

EP    1140625 A1    7/2005

OTHER PUBLICATIONS

Paul Huber et. al., Controlling Nuisance Moisture in Commercial Airplanes, Jan. 16, 1998.
Isidoro Martinez, Aircraft Environmental Control, Jan. 3, 2013.

*Primary Examiner* — Steven B McAllister
*Assistant Examiner* — Jonathan Cotov
(74) *Attorney, Agent, or Firm* — Shimokaji IP

(57) ABSTRACT

A system and method for preventing condensation in a crown area of an aircraft may include routing dry gas into a crown area of the aircraft between the cabin interior panels and the aircraft skin.

8 Claims, 4 Drawing Sheets

(56) References Cited

U.S. PATENT DOCUMENTS

2007/0117501 A1* 5/2007 Solntsev ................ B64D 13/00
                                                              454/76
2010/0170262 A1* 7/2010 Kaslusky ............... B64D 13/00
                                                              60/778
2012/0199315 A1* 8/2012 Barreau ................. B64C 1/067
                                                              165/42

* cited by examiner

SYSTEM FOR PREVENTING WATER CONDENSATION INSIDE AIRCRAFT

BACKGROUND OF THE INVENTION

The present invention generally relates to preventing water condensation inside aircraft. Commercial aircraft may fly at altitudes where the outside air temperature is typically between 0 and −100 F. Although aircraft environmental control systems (ECS) provide warm and comfortable temperatures inside the cabin and cockpit, the temperatures on the inner surfaces of the aircraft skin may remain quite cold as heat is conducted through the skin to the outside air. The aircraft crew and passengers may be protected from these cold temperatures by interior cabin panels and insulation in the space between the interior panels and the aircraft skin, an area which may be referred to as the "aircraft crown".

The aircraft crown may be vented to the cabin to maintain a low pressure differential between the aircraft crown and the cabin during changes in cabin pressure such as occur with changes in aircraft altitude. The low pressure differential may be needed to avoid damage to the interior cabin panels. However, this ventilation means that water vapor in the cabin air may enter the crown. A portion of this water vapor may condense on the cold inner surfaces of the aircraft skin. The condensed moisture may run down the inside surface of the skin, and may be collected in a trough and drained overboard. However, some of it may not be collected as it either drips off low angle surfaces or freezes along the way.

Condensation in the crown may cause a number of problems. The water or ice may accumulate, thus adding to the aircraft weight. The additional weight may negatively impact aircraft performance and increase fuel consumption. The water also may promote the formation of mold mildew which may damage the insulation or cause unpleasant odors in the cabin. And finally, the moisture can cause corrosion which may compromise the aircraft structure, electronic components and electrical connectors.

Existing zonal dryers may address this problem by using an enthalpy wheel and blower to dry a portion of the cabin air and distribute this dry air in the aircraft crown. An electric heater may be used to desorb moisture from the wheel. This added equipment may increase aircraft weight and cost, reduce reliability and require significant electric power to operate.

As can be seen, there is a need for an improved system for preventing water condensation inside aircraft.

SUMMARY

In one aspect of the invention, a condensation prevention system of an aircraft comprises a generating system configured to generate dry gas with a liquid content in the range of 0.01% by mass; a routing system configured to route the generated dry gas into a crown area adjacent to an inner surface of the aircraft; and a pump configured to pump the generated dry gas into the crown area.

In another aspect of the invention, a method for preventing condensation in an aircraft, comprises routing dry gas with liquid content in the range of 0.01% by mass into a crown area of the aircraft adjacent to an inner surface of a skin of the aircraft.

A system for preventing condensation in an aircraft, comprises a trim dryer configured to route gas containing less than 0.1 percent water vapor to a crown area of the aircraft; and a piccolo tube in flow connection with the trim dryer and configured to distribute the dry gas into the crown area.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides a system for preventing water condensation inside aircraft.

More specifically, in contrast to the prior art, the present invention may utilize a condensation prevention system that is configured to dry out an aircraft crown area using dry gas taken from the air outside the aircraft, compressed by the aircraft engines or auxiliary power unit (APU), cooled by the ECS precooler and possibly separated into its molecular constituents by an on-board inert gas generating system (OBIGGS).

Figure 1:
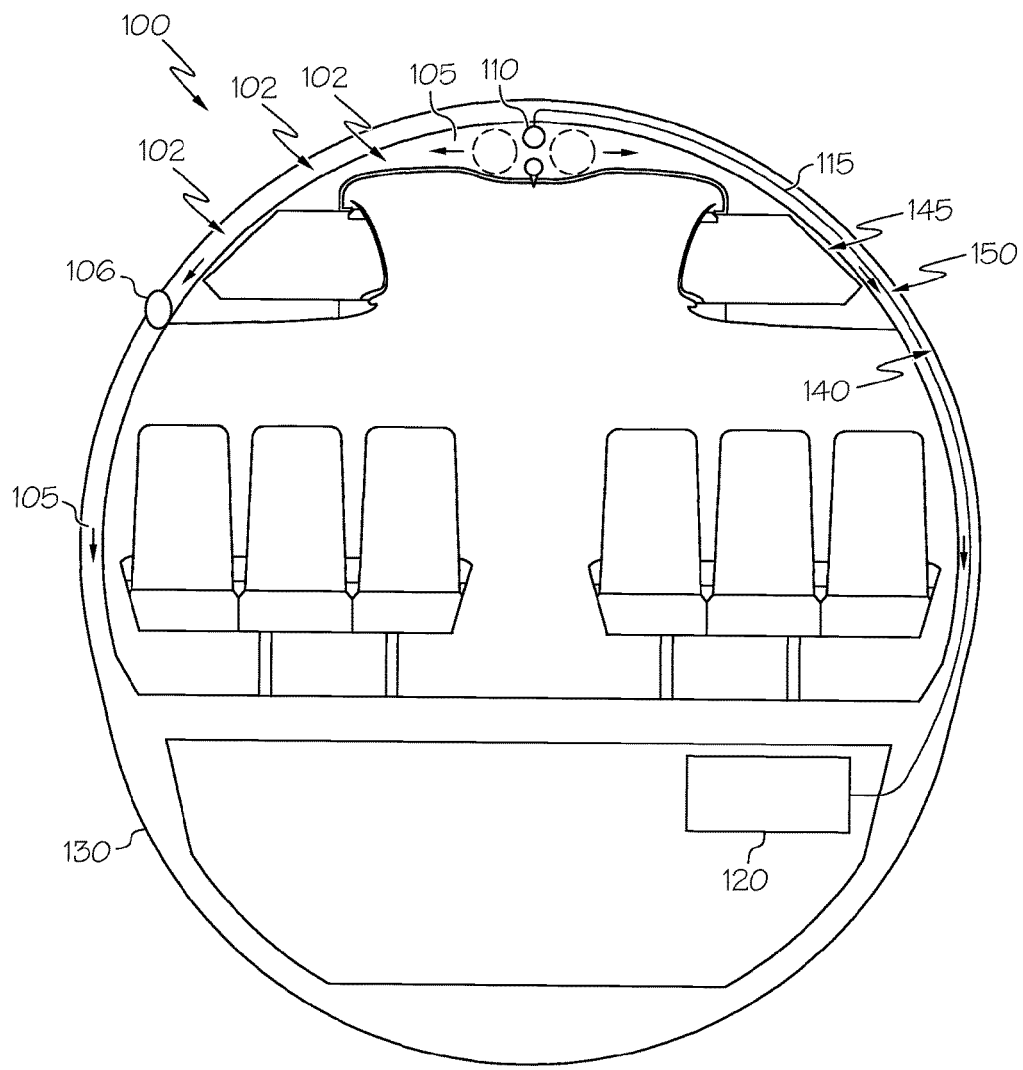
FIG. 1 is a cross section view of a condensation prevention system in accordance with an exemplary embodiment of the present invention.

FIG. 1 illustrates a cross section view of a condensation prevention system 100 for an aircraft. In an exemplary embodiment, the invention may dry out and prevent condensation from building up in a crown area 102 of an aircraft 130. In an exemplary embodiment, a pump system 120, such as an on-board inert gas generating system (OBIGGS) by Honeywell®, may be used to pump dry gas 105 into the crown area 102. The crown area 102 may include an area adjacent to an inner surface 140 of an outer skin 150 of the aircraft 130, such as, for example, between interior cabin liners 145 and the outer skin 150 extending from a top of the aircraft 130 all the way down both sides of the aircraft 130 to the cabin floor. For the purposes of this application, dry gas is gas with little or no water vapor. For example, dry gas may have between zero and 0.01% moisture by weight or mass. In an embodiment, dry gas 105 such as compressed dry air or dry nitrogen may be pumped into the crown area 102. In an exemplary embodiment, the pump system 120 may pump dry gas, for example, dry nitrogen through a supply line 115. The dry gas may be released into the crown area 102 through a distributor 110, for example, a piccolo tube.

Dry gas 105 may assimilate some of the water vapor in the air in the crown area 102 and may carry this vapor out of the crown area 102 where it may be released outside the aircraft 130 through a vent. Supplying the dry gas 105 to the crown area 102 should reduce corrosion, reduce the formation of mold and mildew, and eliminate an accumulated excess weight of water and ice by reducing the moisture content in the crown area 102. In an embodiment, an aircraft environmental control system (ECS) (not shown) may be used to reroute air from outside the aircraft to the crown area 102.

Figure 2:
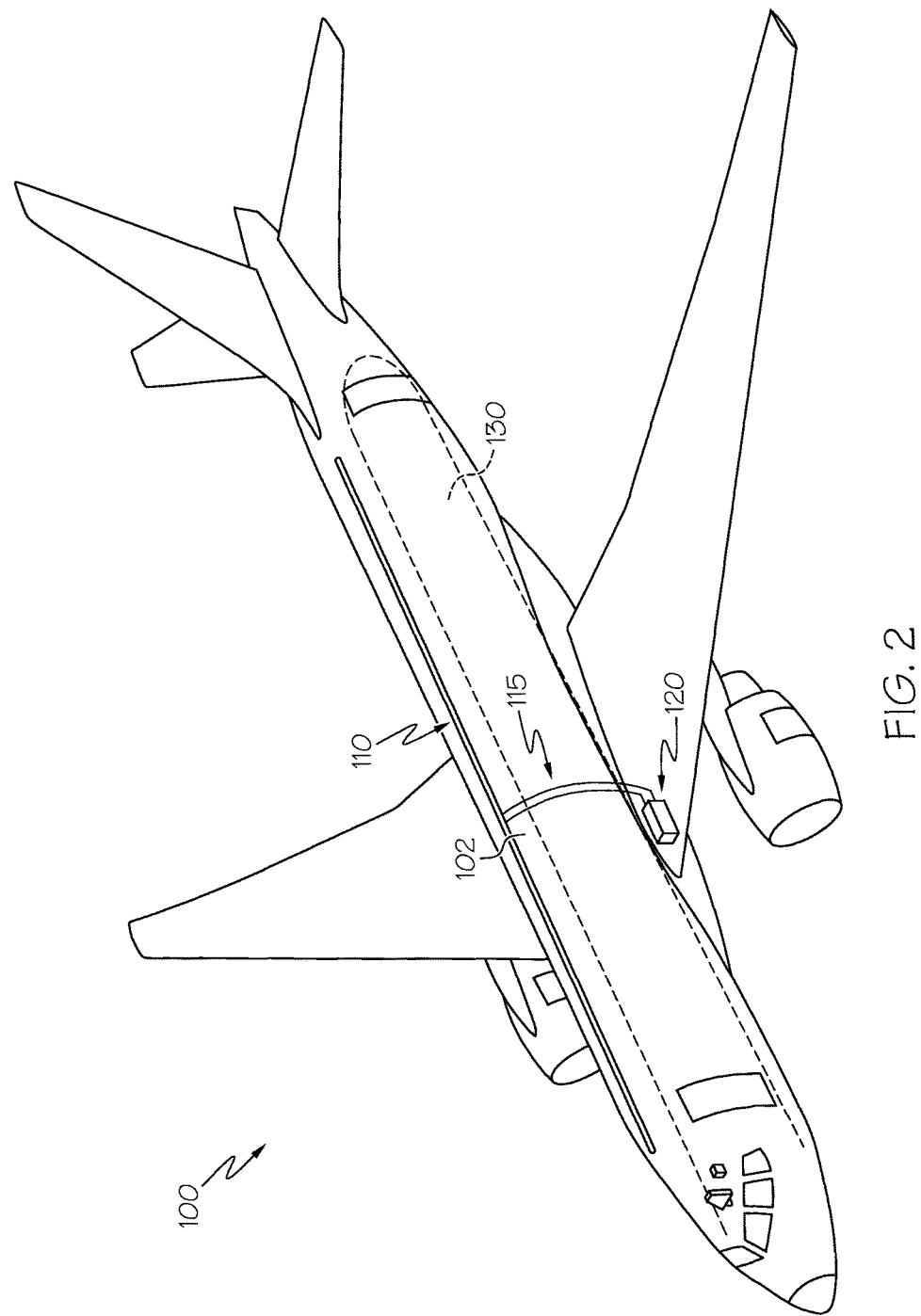
FIG. 2 is a perspective view of an aircraft with the condensation prevention system of FIG. 1.

FIG. 2 illustrates an aircraft 130 with the condensation prevention system 100 from FIG. 1. The distributor 110 may distribute dry air from the pump system 120 into the crown area 102. In an embodiment, the distributor 110 may be located in the crown area 102, and may be positioned parallel to the aircraft 130. The dry air from the ECS trim or dry nitrogen from the OBIGGS 120 may be routed though the supply line 115 to the distributor 110 for distribution into the crown area 102 of the aircraft 130.

Figure 3:
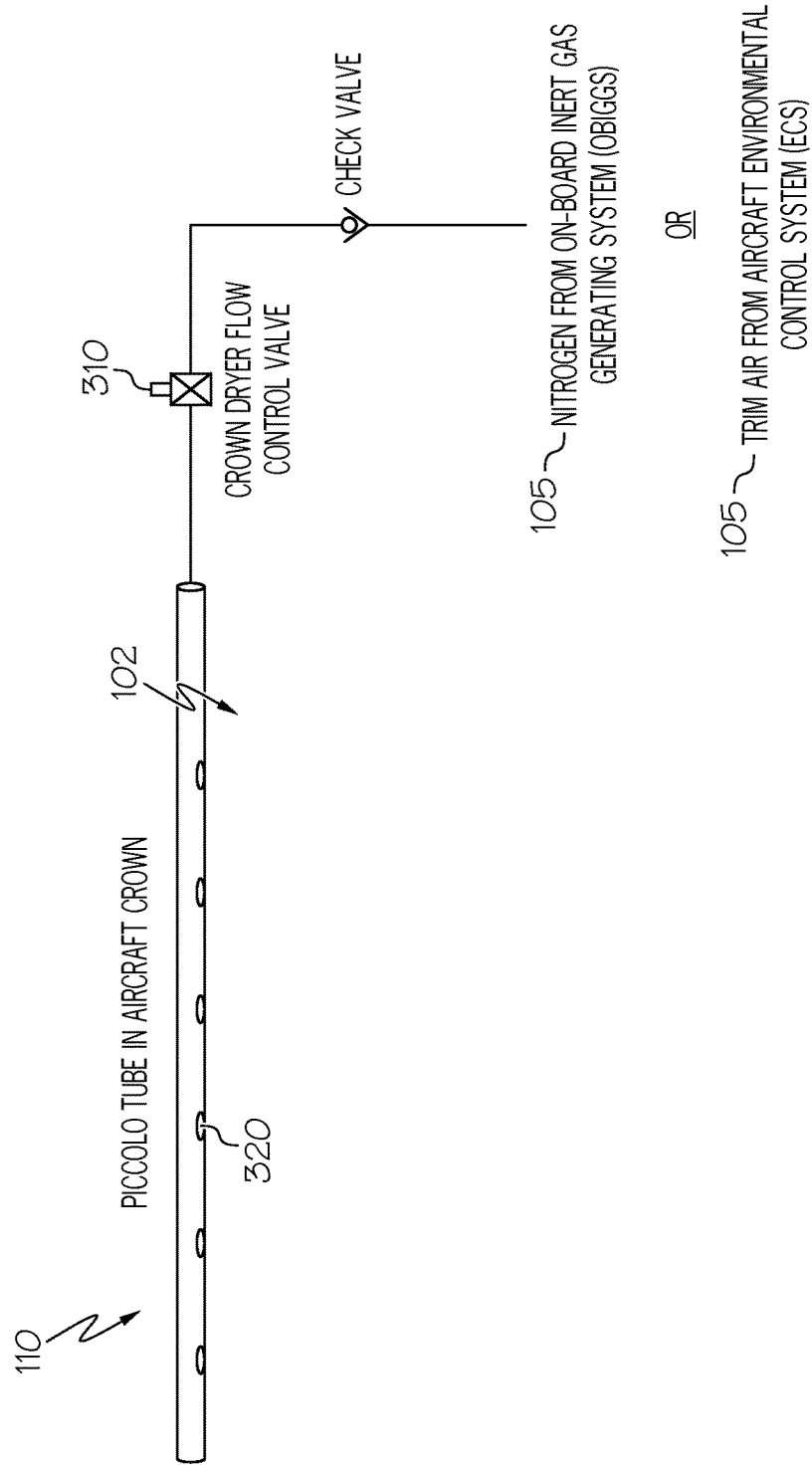
FIG. 3 is a schematic of an exemplary embodiment of a distributor in the condensation prevention system of FIG. 1.

Referring to FIG. 3, a distributor 110, may be, for example, a piccolo tube. In an embodiment, using an OBIGGs system as the pump system 120 (FIG. 1), dry gas 105, may be provided to an electric-motor-driven compressor (not shown) which may bring the gas up to cabin pressure before it is distributed within the crown area 102. Holes 320 within the distributor 110 may allow the dry gas 105 to enter the crown area 102. Inert gas is essentially dry, essentially all water vapor having been removed from the nitrogen with the oxygen. In an embodiment, the pump system 120 (FIG. 1) may dry the dry gas 105 until a dew point of the dry gas 105 is below a temperature of an inner surface 140 (FIG. 1) of the aircraft. The nitrogen may be pumped into the crown area 102 as nitrogen is dry gas. In contrast to a trim dryer which utilizes dry air from outside the aircraft, the OBIGGS dryer separates nitrogen from outside air and uses the separated nitrogen as dry gas for pumping into the crown area 102. Routing nitrogen into the crown area 102 may displace gas from the crown area that may have moisture, and the crown area 102 may therefore dry out. The displaced gas may be vented outside the aircraft (130, FIG. 1).

Engine bleed may be required to generate the inert gas and electric power may be required to compress it to cabin pressure. In yet another embodiment, the condensation prevention system (100, FIG. 1) may only be used on the ground, either while taxing or while at the gate. In this case the motor-driven compressor may not be required as the OBIGGS may generate enough nitrogen pressure to allow the gas to be distributed throughout the aircraft crown.

As another example of the pump system 120 of FIG. 1, a trim dryer may be used, both while the aircraft is in flight, and also while the aircraft is on the ground, but outside air during aircraft flight at typical cruising altitudes has the advantage of being very dry. This dry air may be directly routed into the crown area 102. Air flow to the crown may be controlled by a crown flow control valve 310. The dry outside air may be routed to the piccolo tube 110 for distribution in the aircraft crown area 102.

Figure 4:
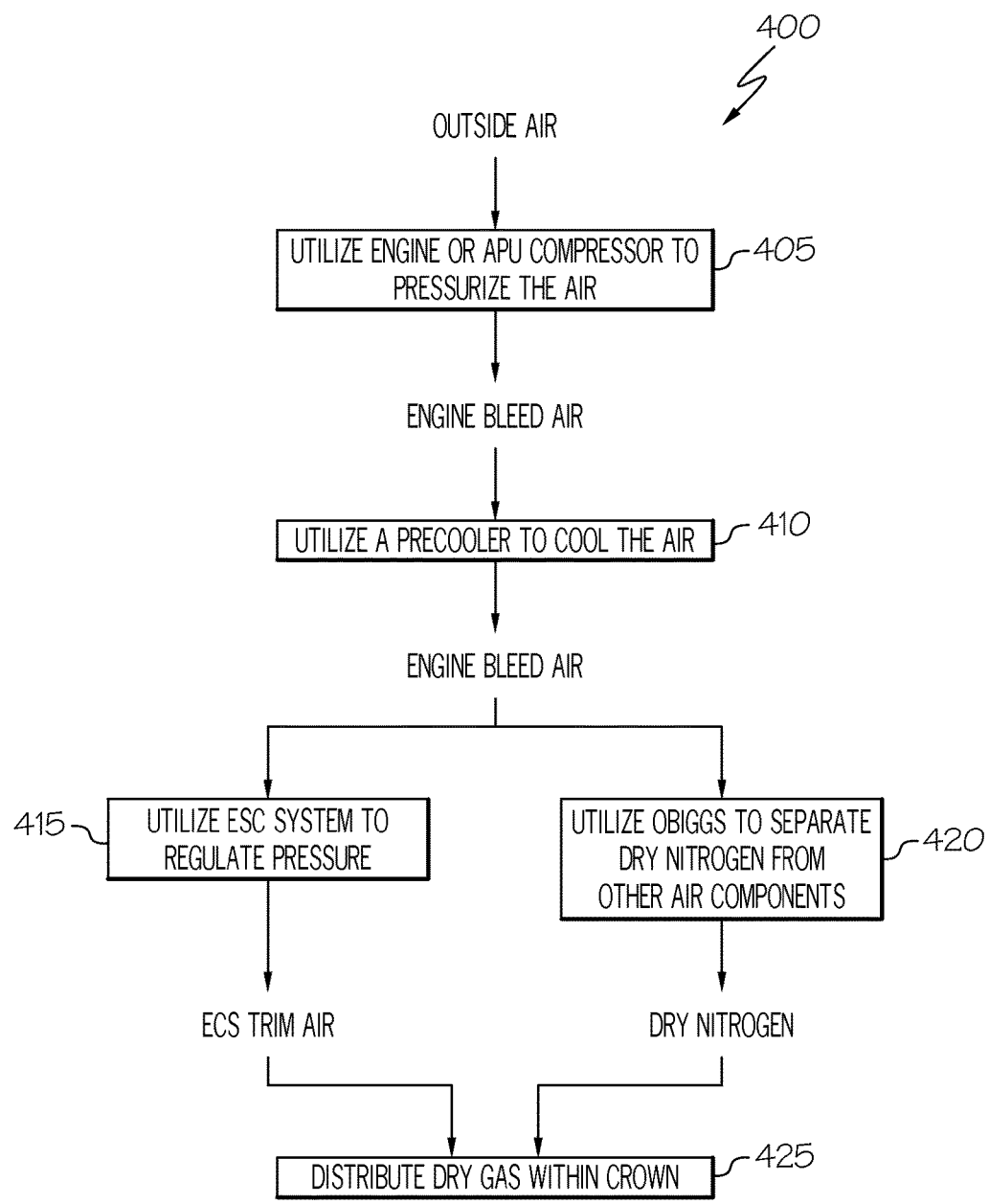
FIG. 4 is a flowchart of a method for preventing condensation in an aircraft using the condensation prevention system of FIG. 1.

FIG. 4 illustrates two methods for implementing the condensation prevention system of FIG. 1 for an aircraft. A step 405 may include utilizing an aircraft engine compressor stages or an auxiliary power unit compressor to pressurize and compress dry air from outside an aircraft. A step 410 may include utilizing a precooler to cool the air, resulting in engine bleed air. A step 415 may include using the ECS system to regulate pressure of the air, resulting in trim air. A step 425 may include distributing the trim air in the aircraft crown.

Rather than utilizing the ECS system to regulate pressure, a step 420 may include utilizing an OBIGGs system to separate dry nitrogen from air components. A step 425 may then include distributing the dry nitrogen as the dry gas within the aircraft crown.

It should be understood, of course, that the foregoing relates to exemplary embodiments of the invention and that modifications may be made without departing from the spirit and scope of the invention as set forth in the following claims.

We claim:

1. A condensation prevention system of an aircraft, comprising:
    an on-board inert gas generating system (OBIGGS) configured to generate dry inert gas with a liquid content from zero to 0.01% by mass; and
    a routing system configured to route the generated dry inert gas from the OBIGGS into a crown area adjacent to an inner surface of the aircraft; and
    a vent in communication with the crown area and with outside of the aircraft;
    wherein dry inert gas assimilated with water vapor in the crown area exits the aircraft via the vent.

2. The system of claim 1, wherein the routing system is configured to route air from outside the aircraft into the crown area.

3. The system of claim 1, wherein the OBIGGS is in communication with compressor stages of aircraft engines and an auxiliary power unit of the aircraft.

4. The system of claim 1, further including a router configured to reroute dry gas from outside the aircraft into the crown area of the aircraft.

5. The system of claim 1, wherein the dry inert gas is nitrogen.

6. A method for preventing condensation in an aircraft, comprising:
    selectively routing, either dry inert gas from an onboard inert gas generating system (OBIGGS) or dry air from an environmental control system of the aircraft, to an electric motor driven compressor;
    compressing one of the dry inert gas and the dry air to an aircraft cabin pressure;
    flowing one of the compressed dry inert gas and the compressed dry air into a crown area of the aircraft adjacent to an inner surface of a skin of the aircraft;
    wherein the dry inert gas and the dry air removes water vapor from the crown area.

7. The method of claim 6, wherein the dry inert gas is nitrogen.

8. The method of claim 6, further including drying the dry gas until a dew point of the dry gas is below the temperature of the inner surface of the aircraft skin.

* * * * *